(12) United States Patent
Dias et al.

(10) Patent No.: US 10,180,926 B2
(45) Date of Patent: Jan. 15, 2019

(54) CONTROLLING DATA STORAGE DEVICES ACROSS MULTIPLE SERVERS

(71) Applicant: Lenovo Enterprise Solutions (Singapore) Pte. Ltd., Singapore (SG)

(72) Inventors: Israel S. Dias, Cary, NC (US); Paul J. Houlbrooke, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 85 days.

(21) Appl. No.: 15/283,831

(22) Filed: Oct. 3, 2016

(65) Prior Publication Data
US 2018/0095924 A1 Apr. 5, 2018

(51) Int. Cl.
*G06F 13/00* (2006.01)
*G06F 13/40* (2006.01)
*G06F 13/42* (2006.01)
*G06F 13/38* (2006.01)
*H04L 29/08* (2006.01)

(52) U.S. Cl.
CPC ........ *G06F 13/4068* (2013.01); *G06F 13/385* (2013.01); *G06F 13/4022* (2013.01); *G06F 13/4282* (2013.01); *H04L 67/1097* (2013.01)

(58) Field of Classification Search
CPC .......................... H04L 67/1097; G06F 13/4022
See application file for complete search history.

(56) References Cited

U.S. PATENT DOCUMENTS

| 2012/0246491 A1* | 9/2012 | Dain ....................... G06F 1/263 713/300 |
| 2013/0117621 A1* | 5/2013 | Saraiya .................. H04L 49/356 714/748 |
| 2013/0145072 A1* | 6/2013 | Venkataraghavan ........................ H04L 67/1097 710/316 |
| 2015/0254088 A1* | 9/2015 | Chou .................. G06F 9/45541 709/212 |

OTHER PUBLICATIONS

Intel.com, "Frequently Asked Questions About the Intel® Storage Controller AXXSCM3S", Article ID: 000006917, Feb. 23, 2016, 6 pages.

* cited by examiner

*Primary Examiner* — Zachary K Huson
(74) *Attorney, Agent, or Firm* — Jeffrey L. Streets

(57) ABSTRACT

A system includes multiple servers, each server including a host bus adapter (HBA) and multiple data storage devices. The system further includes a controller including a switch, wherein the switch has first ports and second ports, each first port being coupled to a HBA of one server, and each second port being coupled to one of the data storage devices, and wherein communications between any of the HBAs and any of the data storage devices are directed through the switch. A method is also provided including coupling multiple host bus adapters to first ports of a controller, wherein multiple servers each include one of the HBAs, coupling multiple data storage devices in each of the servers to second ports of the controller, and directing communications between any of the HBAs and any of the data storage devices through the controller.

20 Claims, 3 Drawing Sheets

CONTROLLING DATA STORAGE DEVICES ACROSS MULTIPLE SERVERS

BACKGROUND

Field of the Invention

The present invention relates to data storage in a computer system that includes multiple servers.

Background of the Related Art

A server is a computing device that provides services for client devices and programs. To better provide these services, the server may include one or more data storage devices that are local to the server and housed with the server enclosure. Accordingly, within a given server, one or more central processing units may access the data storage devices using a host bus adapter. Such a server and its components are self-contained.

A server may utilize additional data storage in the form of an externally accessible storage area network. A storage area network provides block level data storage that is accessible to the server over a network while appearing to the server's operating system as if the storage area network was a locally attached data storage device.

BRIEF SUMMARY

One embodiment of the present invention provides a system comprising a plurality of servers, wherein each server includes a host bus adapter and a plurality of data storage devices. The system further comprises a controller including a switch, wherein the switch has a first set of ports and a second set of ports, each port of the first set of ports being coupled to a host bus adapter of one of the plurality of servers, and each port of the second set of ports being coupled to one of data storage devices of the plurality of servers, and wherein communications between any of the host bus adapters and any of the data storage devices are directed through the switch.

Another embodiment of the present invention provides a method comprising coupling a plurality of host bus adapters to a first set of ports of a controller, wherein a plurality of servers each include one of the host bus adapters, coupling a plurality of data storage devices in each of the plurality of servers to a second set of ports of the controller, and directing communications between any of the host bus adapters and any of the data storage devices through the controller.

DETAILED DESCRIPTION

Figure 1:
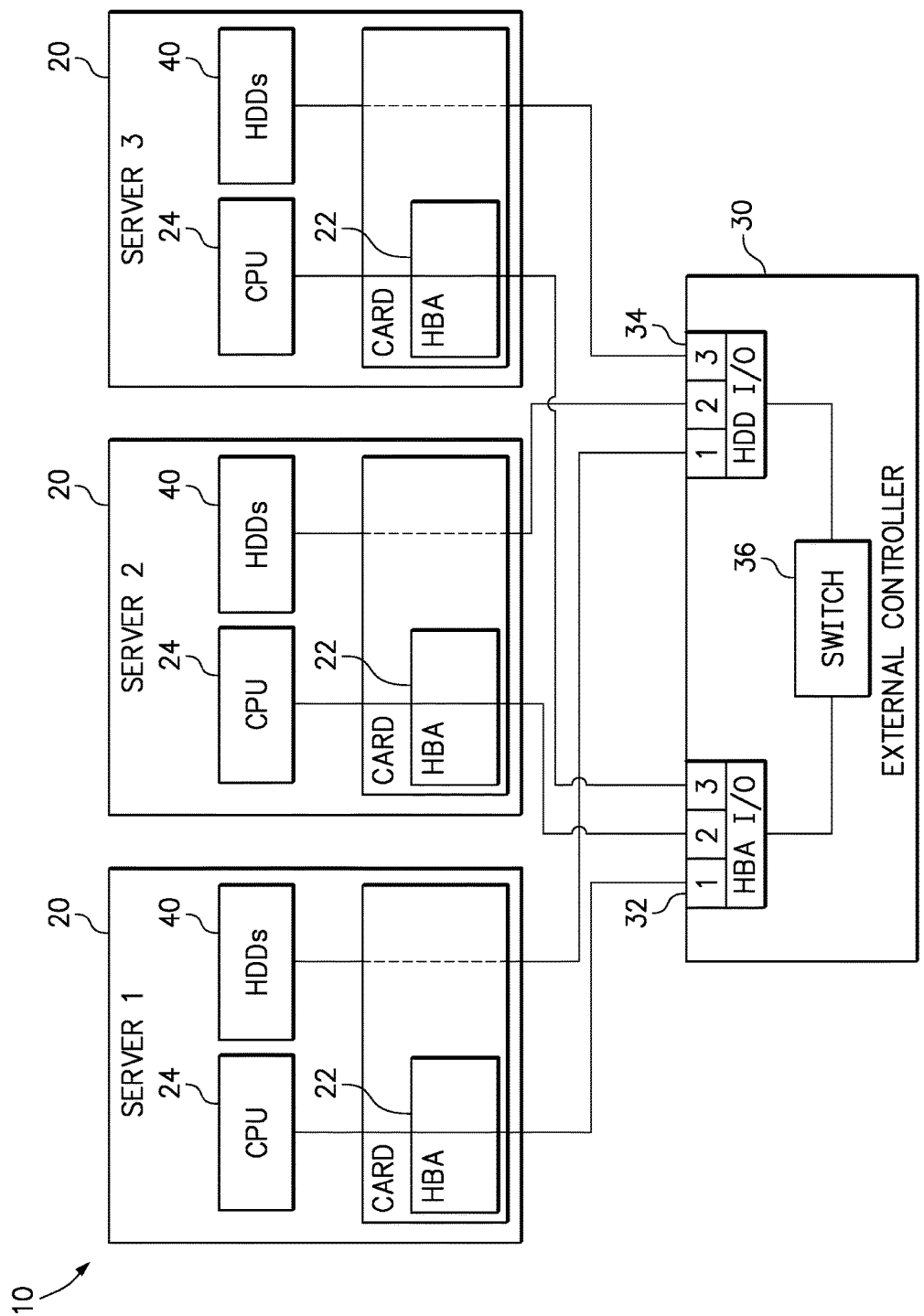
FIG. 1 is a diagram of a system including three servers and an external controller enabling any of the servers to access any of the data storage devices within those servers.

One embodiment of the present invention provides a system comprising a plurality of servers, wherein each server includes a host bus adapter and a plurality of data storage devices. The system further comprises a controller including a switch, wherein the switch has a first set of ports and a second set of ports, each port of the first set of ports being coupled to a host bus adapter of one of the plurality of servers, and each port of the second set of ports being coupled to one of data storage devices of the plurality of servers, and wherein communications between any of the host bus adapters and any of the data storage devices are directed through the switch.

The plurality of data storage devices may be hard disk drives, solid state drives, or some combinations thereof. For example, some servers may include up to 24 hard disk drives disposed within the server enclosure. Embodiments of the present invention provide hardware that allows the data storage devices within the enclosures of multiple servers to be used in a coordinated manner, such as by implementing a storage area network that utilizes one or more of the data storage devices on each of the plurality of servers.

Each server may have block access to each of the data storage devices in each of the servers at a level below the file system. Block access is made possible using the host bus adapter described herein and the controller, since the controller has direct communication with each individual data storage device and can put the host bus adapter of any of the servers in direct communication with any of the data storage devices of any of the servers. The controller has access to multiple server's data storage devices individually, thereby enabling the use of the data storage devices altogether in a larger array than that of a single server.

The controller may be disposed in an enclosure that is separate from any enclosure containing one of the servers, or the controller may be disposed within a designated server among the plurality of servers. In either configuration, the controller operates in the same manner, using a switch to direct communications between any of the host bus adapters and any of the data storage devices.

The host bus adapter within each server may be disposed on an expansion card that includes connections to each data storage device within the server. Optionally, the expansion card may be installed in a peripheral component interface express (PCIe) slot of the server and cables may be used to connect each of the data storage devices to the expansion card. If the controller is internal to the designated server, the controller may, for example, be included on the same expansion card as the host bus adapter for the designated server.

In various embodiments, each data storage device is addressed with a first identifier (ID) for the server that includes the data storage device and a second identifier for the data storage device within each server. For example, in a three-server wide array, each server may have 24 drives, and the addressing must allow for a unique ID for each drive. Individual servers may have data storage devices with device IDs ranging from 0 to 23, but the three-server wide array needs device addresses from 0 to 71. Optionally, the controller unit may assign server enclosure IDs that are unique among the servers that are in direct communication with the controller, and assign device IDs that are unique among the data storage devices within any given server. Accordingly, a complete address for a data storage device may be the combination of a server enclosure ID and a device ID.

In a further embodiment, each server supplies power to the host bus adapter and the plurality of data storage devices of the server even when the server is shutdown. Connecting an always-on "hot bus" to the host bus adapter and each data storage device ensures that each of the data storage devices remain accessible to the controller even if one of the servers is shutdown. This can be accomplished providing a dedicated power cable to the host bus adapter card. Optionally, a driver for the data storage device or the host bus adapter may notify the controller that the server's operating system is preparing to shut down.

In order to improve the reliability of access to the data storage devices, embodiments may further include a redundant controller that is connected in parallel to the controller, wherein communications between any of the host bus adapters and any of the data storage devices are redirected through the redundant controller in response to a failure of the controller. Optionally, a still further increase in the reliability of access to the data storage devices may be achieve by providing redundant host bus adapters in each server. For example, each server may further include a redundant host bus adapter coupled to a redundant controller and coupled to each of the data storage devices within the server, wherein communications between any of the servers and any of the data storage devices are redirected through the redundant host bus adapters and the redundant controller in response to a failure of the controller or a host bus adapter. In the case of either full or partial redundancy of the hardware path, both hardware paths may be active or only one hardware path may active at a time. In the later instance, one hardware path is active and the other hardware path is passive until a hardware failure in the active path causes the data to be moved over to the previously passive (now active) hardware path.

In one embodiment, partial (external) redundancy is implemented by providing the host bus adapter with duplicate output connections to avoid single point-of-failures on the cabling side. For example, active-passive cablings may be used and the host bus adapter may have the additional capability of controlling the active path negotiated with the controller. In the case of a controller failure, the volumes and disk access routes may be managed by the redundant controller, which may also be able to command a full re-route to all the participating host bus adapters.

In another embodiment, full end-to-end redundancy may be implemented having two host bus adapters per server, plus a SAS expander backplane that has been modified to duplicate the inbound-outbound signals from the data storage devices. Full end-to-end redundancy may also include a special driver for multipath control.

Another embodiment of the present invention provides a method comprising coupling a plurality of host bus adapters to a first set of ports of a controller, wherein a plurality of servers each include one of the host bus adapters, coupling a plurality of data storage devices in each of the plurality of servers to a second set of ports of the controller, and directing two-way communication between any of the host bus adapters and any of the data storage devices through the controller.

Optionally, the method may implement a storage area network (SAN) including one or more of the data storage devices on each of the plurality of servers. In another option, the method may implement a redundant array of independent disks (RAID) including one or more of the data storage devices on each of the plurality of servers. In a still further option, the method may further include addressing each data storage device with a first identifier for the server that includes the data storage device and a second identifier for the data storage device within the server. In yet another option, the method may include maintaining, for each of the servers, power to the host bus adapter and each of the data storage devices even when the server is shutdown.

Embodiments of the present invention aggregate hard drives across multiple servers in the same logical domain, allowing repartitioning, enclosure-level redundancy and SAN attachment. Accordingly, the unused disk-space may be repurposed without the need to purchase external enclosures, or the unused disk-space may reduce the real-estate required to implement a storage area network (SAN) by combining the server and disk storage into one physical unit.

The foregoing computer program products may further include program instructions for implementing or initiating any one or more aspects of the methods described herein. Accordingly, a separate description of the methods will not be duplicated in the context of a computer program product.

FIG. 1 is a diagram of a system 10 including three servers 20 and an external controller 30 enabling any of the servers 20 to access any of the hard disk drives (HDDs) 40 within those servers. Each server 20 includes a host bus adapter 22 coupled to a central processing unit (CPU) 24 by a system bus. Each host bus adapter 22 has an output that is connected to an HBA port 32 of the controller 30. In a system with a greater number of servers, the number of HBA ports should be similarly increased. Each server 20 also includes a plurality of HHDs 40 that are each coupled to a device port 34 of the controller 30. While only three connections are shown, it should be recognized that the number of device ports 34 should equal to or greater than the total number of hard disk drives within the plurality of servers.

The controller 30 includes a switch 36 that is coupled between the HBA ports 32 and the device ports 34. The controller causes the switch 36 to direct communications between any of the host bus adapters 22 and any of the data storage devices 40 according to device addresses that the host bus adapters 22 provide to the controller 30 along with a read or write instruction.

The host bus adapters 22 translate commands received on the system bus from the CPU 24 and send corresponding instructions to (receive responses from) the HDDs 40 via the controller 30. The HDDs 40 perform read and write tasks according to instructions received from any of the CPUs 24, and return data and/or acknowledgements back to the CPUs 24 via the respective host bus adapter 22.

The HHDs 40 within a server are preferably connected to a backplane or other configuration of printed circuit board assembly, with the backplane then provide each HDD with a separate connection to the controller 30. For example, each of the separate connections may be a Serial Attached SCSI (SAS) cable. Optionally, each HDD may be connected from the backplane to the controller with a pair of SAS cables for the purpose of providing redundancy.

Figure 2:
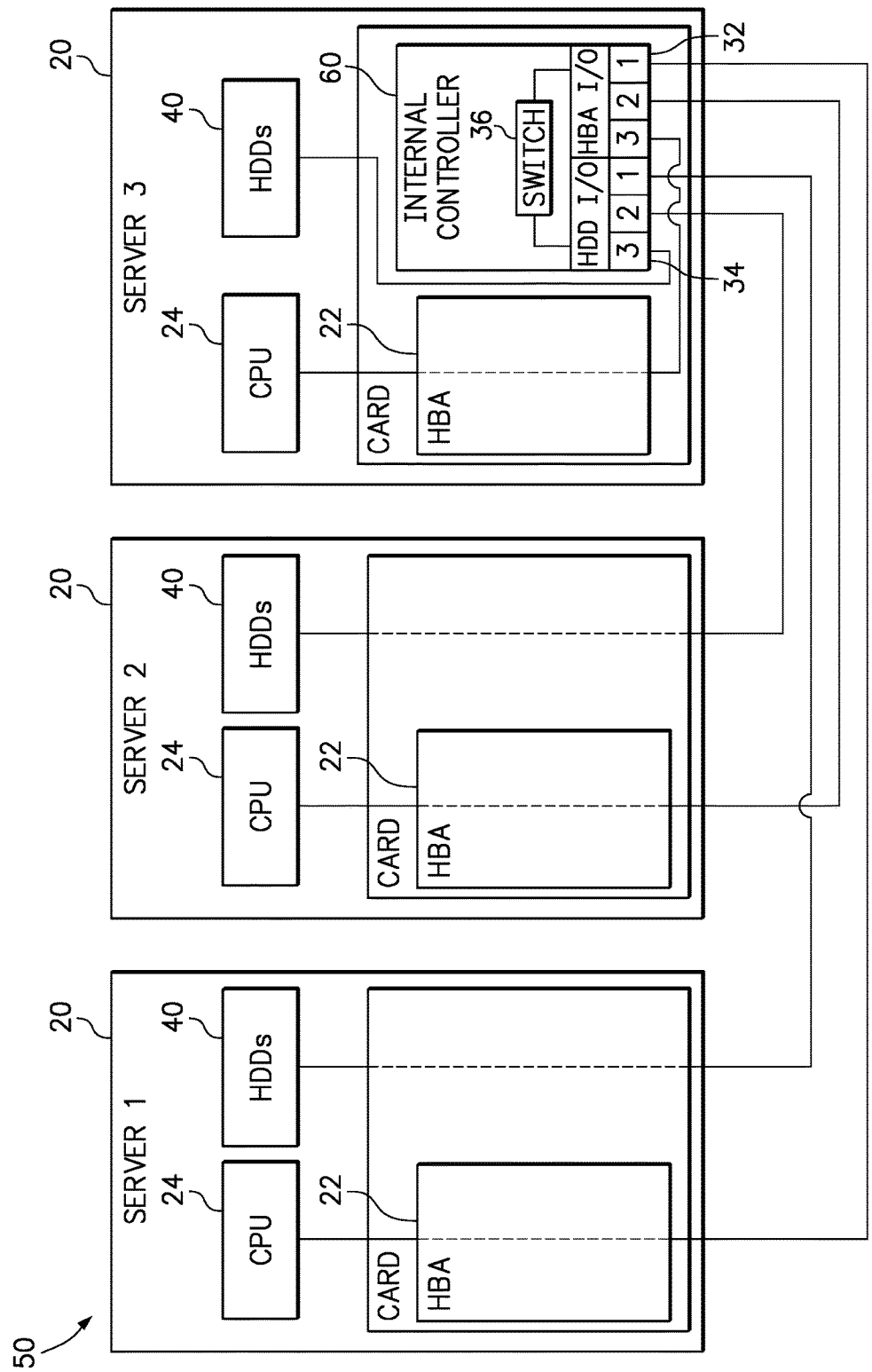
FIG. 2 is a diagram of a system including three servers and an internal controller enabling any of the servers to access any of the data storage devices within those servers.

FIG. 2 is a diagram of a system 50 including three servers 20 and an internal controller 60 enabling any of the servers 20 to access any of the hard disk drives (HDDs) 40 within those servers. Throughout FIG. 2, the use of the same reference number as used in FIG. 1 implies that the component performs substantially in the same manner as described in reference to FIG. 1. The primary difference between FIG. 1 and FIG. 2 is that system 50 has an internal controller 60 located within one of the servers 20 whereas system 10 has an external controller 30. Otherwise, the HBA ports 32, device ports 34, and switch 36 operate in the same manner as described in reference to FIG. 1.

Figure 3:
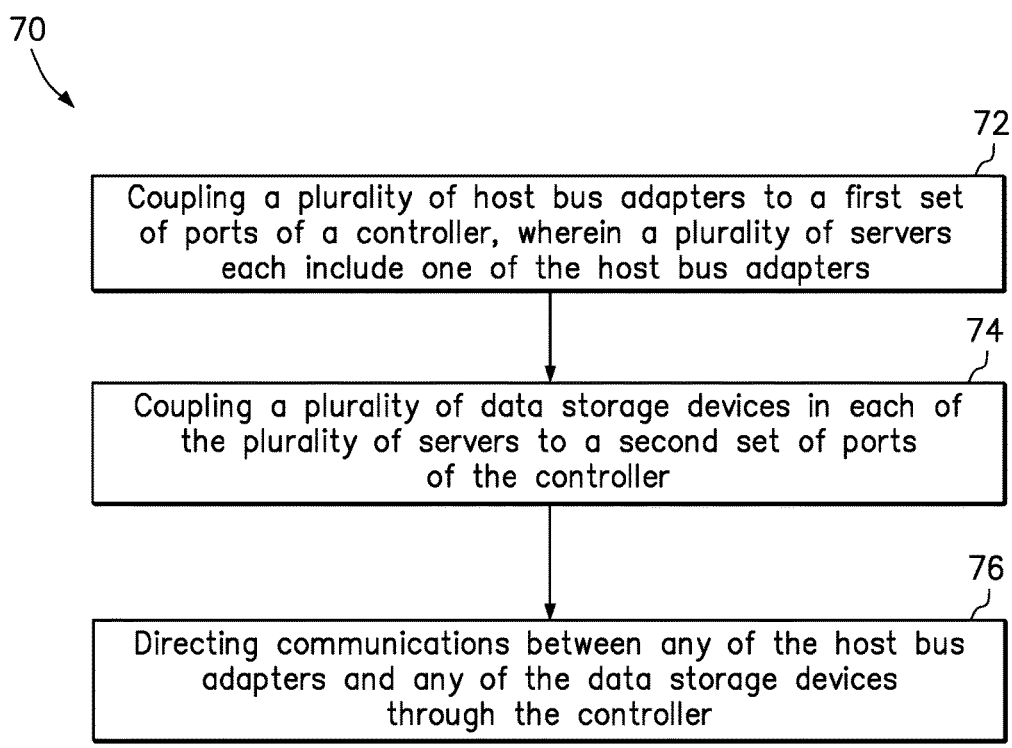
FIG. 3 is a flowchart of a method according to one embodiment of the present invention.

FIG. 3 is a flowchart of a method 70 according to one embodiment of the present invention. In step 72, the method includes coupling a plurality of host bus adapters to a first set of ports of a controller, wherein a plurality of servers each include one of the host bus adapters. In step 74, the method includes coupling a plurality of data storage devices in each of the plurality of servers to a second set of ports of the controller. Step 76 of the method includes directing communications between any of the host bus adapters and any of the data storage devices through the controller.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a plurality of servers, each server including a host bus adapter and a plurality of data storage devices; and
   a controller including a switch, wherein the switch has a first set of ports and a second set of ports, each port of the first set of ports being coupled to a host bus adapter of one of the plurality of servers with a SAS cable, and each port of the second set of ports being coupled to one of data storage devices of the plurality of servers with a SAS cable, and wherein communications between any of the host bus adapters and any of the data storage devices are directed through the controller.

2. The system of claim 1, wherein the data storage devices are hard disk drives.

3. The system of claim 1, wherein the controller implements a storage area network including one or more of the data storage devices on each of the plurality of servers.

4. The system of claim 3, wherein each of the plurality of servers has a server enclosure, and wherein each of the data storage devices in the storage area network are included in the server enclosures.

5. The system of claim 1, wherein the plurality of servers are in the same logical domain.

6. The system of claim 1, wherein the controller is disposed in an enclosure that is separate from any enclosure containing one of the servers.

7. The system of claim 1, wherein the controller is disposed within a designated server among the plurality of servers.

8. The system of claim 7, wherein the controller is in communication with a PCI Express bus of the designated server.

9. The system of claim 1, wherein each host bus adapter within a server is disposed on an expansion card that includes connections to each data storage device within the server.

10. The system of claim 1, wherein the controller addresses each data storage device with a first identifier for the server and a second identifier for the data storage device within each server.

11. The system of claim 1, wherein each server supplies power to the host bus adapter and the plurality of data storage devices of the server even when the server is shutdown.

12. The system of claim 1, further comprising:
    a redundant controller independently coupled to each host bus adapter, wherein communications between any of the host bus adapters and any of the data storage devices are redirected through the redundant controller in response to a failure of the controller.

13. The system of claim 1, wherein each server further includes a redundant host bus adapter coupled to a redundant controller and coupled to each of the data storage devices within the server, wherein communications between any of the servers and any of the data storage devices are redirected through the redundant host bus adapters and the redundant controller in response to a failure of the controller or a host bus adapter.

14. The system of claim 1, wherein each server has block access to each of the data storage devices in each of the servers at a level below the file system.

15. A method comprising:
    coupling a plurality of host bus adapters to a first set of ports of a controller with a SAS cable, wherein a plurality of servers each include one of the host bus adapters;
    coupling a plurality of data storage devices in each of the plurality of servers to a second set of ports of the controller with a SAS cable; and
    directing communications between any of the host bus adapters and any of the data storage devices through the controller.

16. The method of claim 15, further comprising:
    implementing a storage area network including one or more of the data storage devices on each of the plurality of servers.

17. The method of claim 15, further comprising:
    implementing a redundant array of independent disks including one or more of the data storage devices on each of the plurality of servers.

18. The method of claim 15, further comprising:
addressing each data storage device with a first identifier for the server that includes the data storage device and a second identifier for the data storage device within the server.

19. The method of claim 15, further comprising:
maintaining, for each of the servers, power to the host bus adapter and each of the data storage devices even when the server is shutdown.

20. The method of claim 15, wherein the controller includes a switch that is in communication with each port of the first and second sets of ports.

* * * * *